(12) United States Patent
Yen et al.

(10) Patent No.: US 11,087,935 B2
(45) Date of Patent: Aug. 10, 2021

(54) KEY SWITCH STRUCTURE AND ASSEMBLING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Fu Yen, Taipei (TW); Chia-Shiun Wu, Taipei (TW); Hsiang-Sheng Chuang, Taipei (TW); Cheng-Hsiung Huang, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 233 days.

(21) Appl. No.: 16/257,742

(22) Filed: Jan. 25, 2019

(65) Prior Publication Data

US 2019/0237278 A1 Aug. 1, 2019

Related U.S. Application Data

(60) Provisional application No. 62/622,979, filed on Jan. 29, 2018.

(51) Int. Cl.
*H01H 13/7065* (2006.01)
*H01H 13/83* (2006.01)
*G06F 3/02* (2006.01)

(52) U.S. Cl.
CPC ........ *H01H 13/7065* (2013.01); *G06F 3/0202* (2013.01); *H01H 13/83* (2013.01); *H01H 2219/048* (2013.01)

(58) Field of Classification Search
CPC ............. H01H 13/7065; H01H 13/83; H01H 2219/048; H01H 13/06; H01H 3/125; H01H 2215/006; H01H 2239/034; G06F 3/0202
(Continued)

(56) References Cited

U.S. PATENT DOCUMENTS 6,860,612 B2 * 3/2005 Chiang ............... G02B 6/0005
200/314
8,022,322 B2 9/2011 Yamada et al.
(Continued)

FOREIGN PATENT DOCUMENTS

| CN | 101752127 A | 6/2010 |
|---|---|---|
| CN | 106257937 A | 12/2016 |
| CN | 107134387 A | 9/2017 |

OTHER PUBLICATIONS

"Chinese Application Serial No. 201910074853.0 , Office Action dated Jun. 3, 2020" 9 pgs.

*Primary Examiner* — Edwin A. Leon
(74) *Attorney, Agent, or Firm* — Innovation Counsel LLP (57) ABSTRACT

A key switch structure and an assembling method thereof are provided. The key switch structure includes a bottom plate, a keycap, a supporting assembly, first connectors, and second connectors. The keycap is disposed on the bottom plate. The supporting assembly is disposed between the bottom plate and the keycap. The first connectors disposed on the bottom plate are integrally formed and directly bonded to the upper surface of the bottom plate, wherein the first connectors and the bottom plate are made of different materials. The second connectors are disposed on the keycap. The supporting assembly is connected to the bottom plate and the keycap through the first connectors and the second connectors.

26 Claims, 11 Drawing Sheets

(58) Field of Classification Search
USPC .......................................................... 200/310
See application file for complete search history.

(56) References Cited

U.S. PATENT DOCUMENTS

| 8,057,722 | B2 | | 11/2011 | Liang | |
|---|---|---|---|---|---|
| 2013/0306455 | A1 | * | 11/2013 | Wang ..................... | H01H 13/83 |
| | | | | | 200/5 A |
| 2015/0340176 | A1 | * | 11/2015 | Wu ........................ | H01H 13/88 |
| | | | | | 200/5 A |

* cited by examiner

KEY SWITCH STRUCTURE AND ASSEMBLING METHOD THEREOF

This application claims the benefit of U.S. provisional application Ser. No. 62/622,979, filed Jan. 29, 2018, the subject matter of which is incorporated herein by reference.

BACKGROUND OF THE INVENTION

Field of the Invention

The invention relates in general to a key switch structure, and more particularly to a key switch structure of a thin keyboard and an assembling method thereof.

Description of the Related Art

Keyboards are primary and important input interfaces for personal computers, notebooks and mobile devices. Based on key switch structures of the keyboards, the keyboards can be divided into thin-film keyboards and mechanical keyboards. The thin-film keyboard, having the advantages of simple structure, lower cost and one-piece design of the thin-film circuit, has been widely used in the industries. To meet a high demand for a thinner keyboard, an effective course of displacement from a keycap of the key switch to a bottom plate must be reduced. In other words, the overall travel distance the keycap moves up and down needs to be further shortened.

In general, the key switch has an X-shaped scissor mechanism to guide the keycap to move up and down. The upper ends of the X-shaped scissor mechanism are connected to the underneath of the keycap, and the lower ends of the X-shaped scissor mechanism are connected to the top of the bottom plate respectively via a pivot member and a limiting member. The pivot member and the limiting member located on the bottom plate are formed by performing a stamping process on a bottom plate material made of metal, so that a portion of the bottom plate material is punched and bent as the pivot member and the limiting member. As sufficient structural strength is required for the pivot member and the limiting member formed on the bottom plate to support the X-shaped scissor mechanism, the thickness of the bottom plate needs to be increased to avoid the deformation of the pivot member and the limiting member during the assembly process of the X-shaped scissor mechanism. Thus, it has become a prominent task for the industries to develop a thinner and lighter key switch structure.

SUMMARY OF THE INVENTION

The invention is directed to a key switch structure and an assembling method thereof, and the key switch structure could use a thinner bottom plate capable of reducing the thickness of the bottom plate, providing a pivot member and a limiting member with sufficient supporting strength, and quickly installing the keycap on the bottom plate through the pivot member and the limiting member. Thus, the key switch structure can comply with the requirements of low thickness and lightweight.

According to one embodiment of the present invention, a key switch structure including a bottom plate, a keycap, a supporting assembly, multiple first connectors and multiple second connectors is provided. The keycap is disposed on the bottom plate. The supporting assembly is disposed between the bottom plate and the keycap. The first connectors are disposed on the bottom plate and integrally formed and directly bonded to the upper surface of the bottom plate, and the first connectors and the bottom plate are made of different materials. The second connectors are disposed on the keycap. The supporting assembly is connected to the bottom plate and the keycap respectively through the first connectors and the second connectors.

According to one embodiment of the present invention, an assembling method of a key switch structure is provided. The assembling method includes the following steps. A first porous structure is formed on the upper surface of a bottom plate. A plurality of first connectors is formed on the bottom plate, wherein the first connectors fill in the first porous structure and are directly bonded to the upper surface of the bottom plate to form an integral piece. A supporting assembly is disposed on the bottom plate, wherein a first end of the supporting assembly is connected to the first connectors. A keycap is disposed on the supporting assembly, wherein a second end of the supporting assembly is connected to the keycap.

According to one embodiment of the present invention, an assembling method of a key switch structure is provided, wherein forming the first porous structure on the upper surface of the bottom plate includes performing a surface treatment to the upper surface of the bottom plate.

According to one embodiment of the present invention, an assembling method of a key switch structure is provided, wherein forming the first connectors on the bottom plate includes injection molding and integrally bonding a plastic material to the upper surface of the bottom plate through integration of different materials.

According to one embodiment of the present invention, an assembling method of a key switch structure is provided, wherein the upper surface of the bottom plate includes a metal surface.

According to one embodiment of the present invention, an assembling method of a key switch structure is provided. The assembling method further includes forming multiple second connectors on the lower surface of the keycap, wherein a second end of the supporting assembly is connected to the second connectors.

According to one embodiment of the present invention, an assembling method of a key switch structure is provided. The method of forming the second connectors on the lower surface of the keycap includes the following steps. A second porous structure is formed on the lower surface of a metal layer, wherein the second connectors formed on the metal layer are filled to the second porous structure and directly bonded to the lower surface of the metal layer through heterogeneous integration. A cover layer is formed on the upper surface of the metal layer by injection.

According to one embodiment of the present invention, an assembling method of a key switch structure is provided, wherein forming the second porous structure on the lower surface of the metal layer includes performing a surface treatment to the lower surface of the metal layer.

According to one embodiment of the present invention, an assembling method of a key switch structure is provided, wherein injection molding and integrally bonding a plastic material to the lower surface of the metal layer through integration of different materials.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention.

Figure 1A:
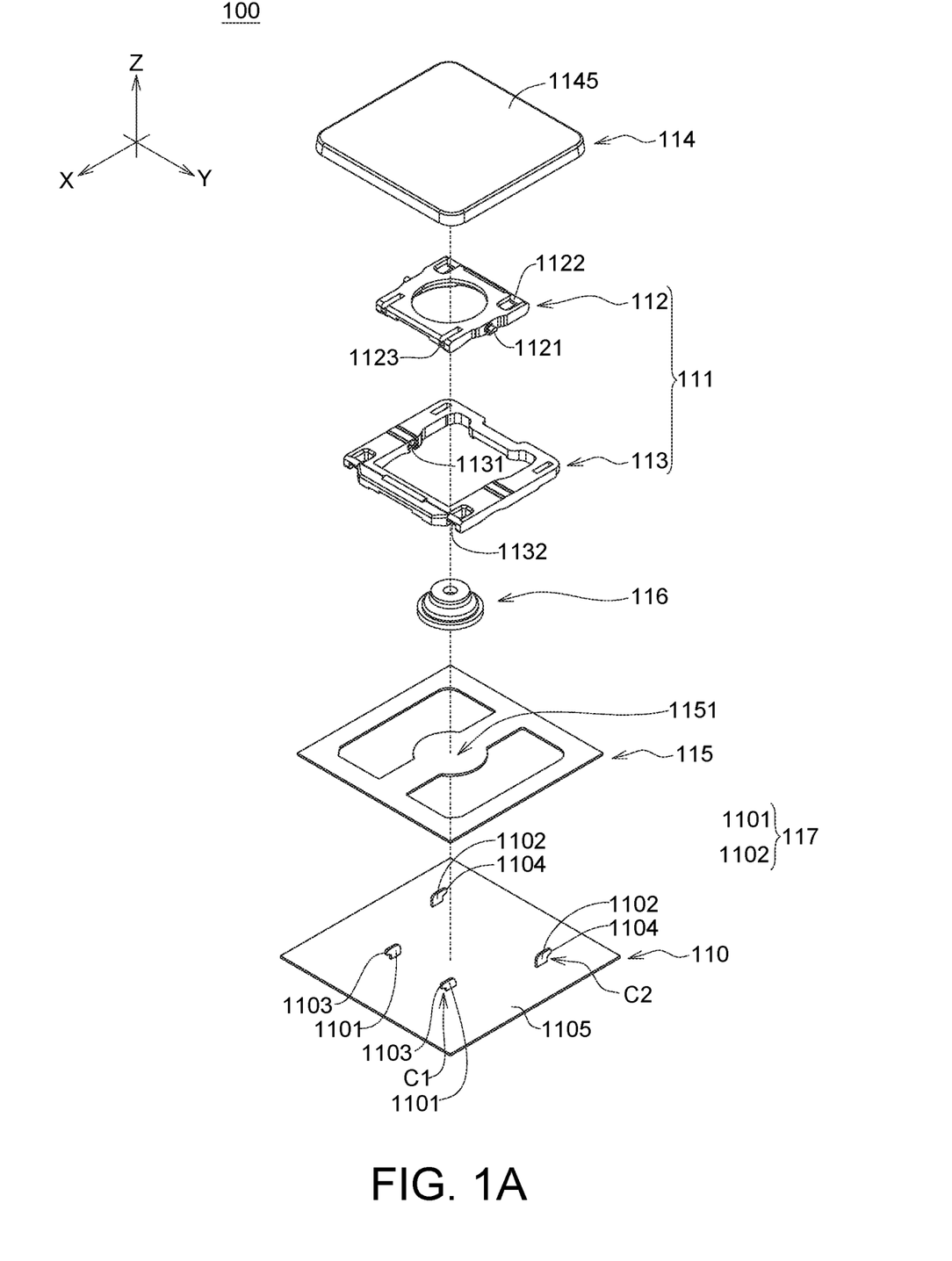
FIG. 1A is an exploded-view diagram of a key switch structure according to an embodiment of the present invention.
Figure 1B:
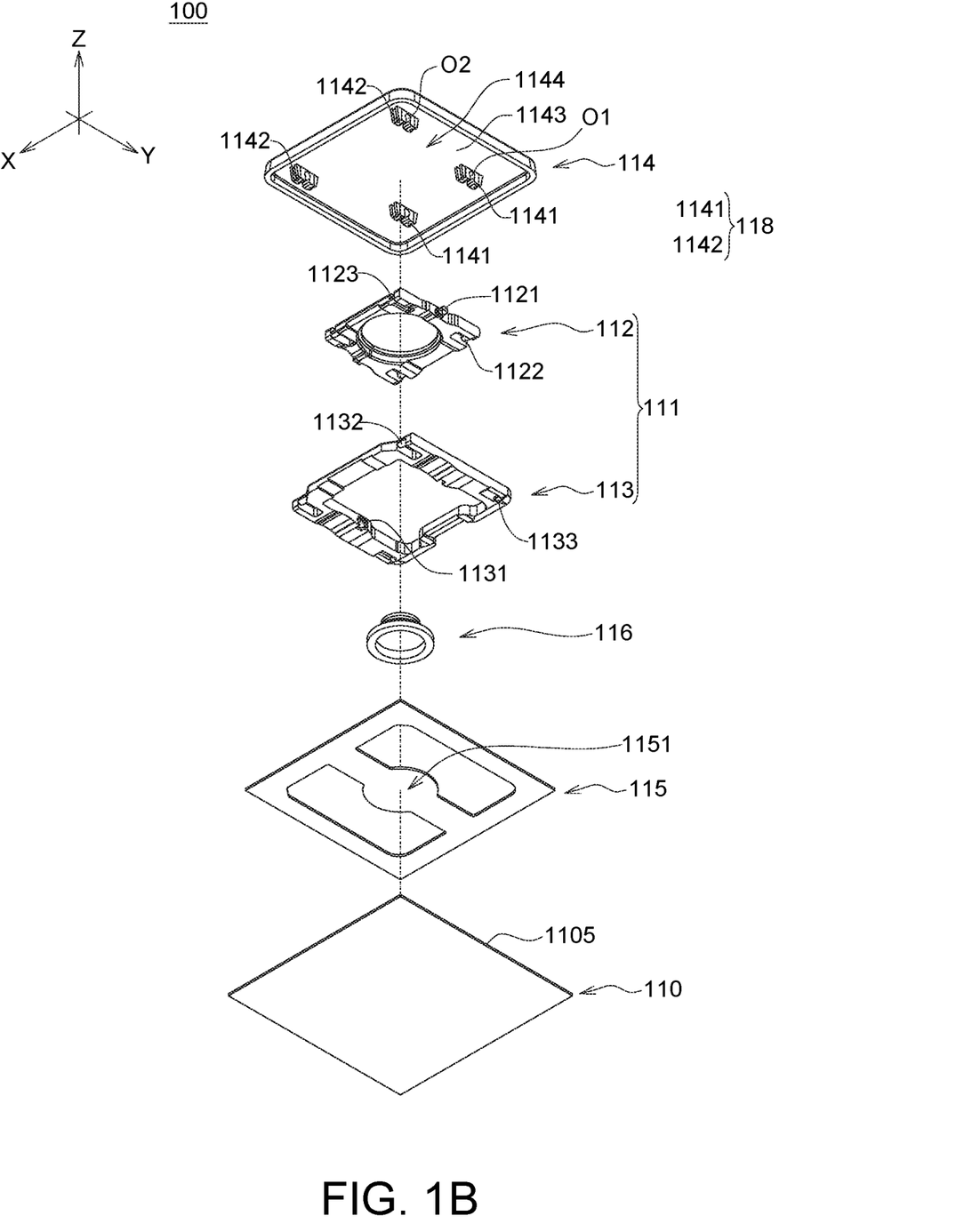
FIG. 1B is an exploded-view diagram of a key switch structure from another view angle according to an embodiment of the present invention.

Referring to FIG. 1A and FIG. 1B, in an embodiment of the present invention, a key switch structure 100 includes a bottom plate 110, a supporting assembly 111, a keycap 114, first connectors 117, and second connectors 118. The keycap 114 is disposed on the bottom plate 110. The supporting assembly 111 is disposed between the bottom plate 110 and the keycap 114. The first connectors 117 are disposed on the bottom plate 110. For example, the first connectors 117 are made of a material different from that of the bottom plate 110, and integrally formed and integrated on the bottom plate 110. The first connectors 117 are directly bonded to the upper surface 1105 of the bottom plate 110 to form an integral single piece. The second connectors 118 are disposed on the keyboard 114. For example, the second connectors 118 are made of a material different from that of the bottom plate 110, and integrally formed and integrated on the keycap 114. The second connectors 118 are directly bonded to the lower surface 1143 of the keycap 114 in an integral form. Furthermore, the supporting assembly 111 is connected to the bottom plate 110 and the keycap 114 through the first connectors 117 and the second connectors 118.

In an embodiment, the supporting assembly 111, which can be an X-shaped scissor mechanism, includes a first supporter 112 and a second supporter 113. The first supporter 112 is provided with protuberances 1121, and the second supporter 113 is provided with holes 1131 for receiving the protuberances 1121. The protuberances 1121 can slide into the holes 1131. Thus, the first supporter 112 can be rotatably connected with the second supporter 113 through the protuberances 1121 received in the holes 1131.

The first supporter 112 and the second supporter 113 respectively have first engagement shafts 1122 and second engagement shafts 1132. The first supporter 112 and the second supporter 113 respectively have first sliding shafts 1123 and second sliding shafts 1133 on the opposite side of the corresponding first engagement shafts 1122 and second engagement shafts 1132.

Moreover, the key switch structure 100 may further include a circuit board 115 and an elastic member 116. The circuit board 115 is disposed between the bottom plate 110 and the elastic member 116, and includes a switch element 1151. The circuit board 115 is, for instance, a thin-film circuit board or membrane circuit board. The elastic member 116 is disposed on the switch element 1151 and configured to support the keycap 114, such that the keycap 114 can move up or down with respect to the bottom plate 110 through the connection of the supporting assembly 111. When the keycap 114 is not pressed, the elastic member 116 remains its initial condition without an elastic deformation. When the keycap 114 is pressed down, the elastic member 116 undergoes the elastic deformation to contact and trigger the switch element 1151, thereby generating a signal.

Refer to FIG. 1A. The first connectors 117 may include two first limiting members 1101 and two second limiting members 1102. Each first limiting member 1101 has a first sliding guide 1103 extending along the positive X-rigidness direction to form an inverted L-shaped structure like a beak structure. Each second limiting member 1102 has a second sliding guide 1104 extending along the negative X-rigidness direction to form an inverted L-shaped structure like a beak structure. A first accommodation C1 and a second accommodation C2 are respectively defined between the first sliding guide 1103 and the upper surface 1105 and between the second sliding guide 1104 and the upper surface 1105 of the bottom plate 110 for receiving the first sliding shafts 1123 and the second sliding shafts 1133.

Figure 2A:
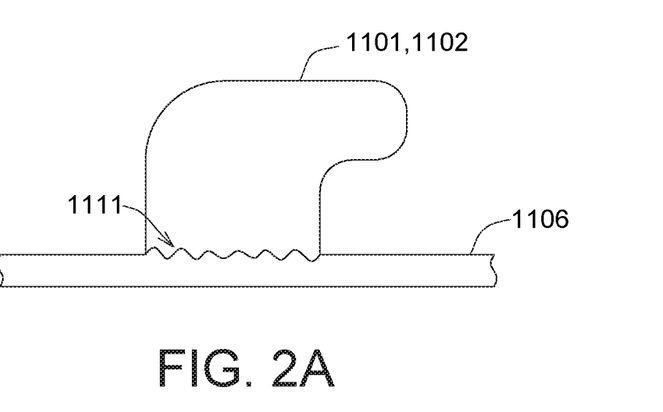
FIG. 2A is a schematic diagram of a connector.

The bottom plate 110 can be made by a metal plate, such as a stainless steel plate, a galvanized steel plate, an aluminum plate or an aluminum-magnesium alloy plate. The first connectors 117 can be made by plastic parts formed of polyoxymethylene (POM) or ABS resin. Referring to FIG. 1A and FIG. 2A, in an embodiment, the upper surface 1105 of the bottom plate 110 includes a metal surface 1106 having a porous structure. Depending on the sizes of pores or structures, the metal surface 1106 could have a microporous structure formed thereon. The first limiting member 1101 and the second limiting member 1102 can fill into the porous structure, and are directly bonded and joined to the metal surface 1106 to form a bonding structure 1111 at a hetero-interface between the metal surface 1106 and the plastic limiting members.

In an embodiment, the method of forming the porous structure may include performing a surface treatment to the upper surface 1105 of the bottom plate 110 to roughen the surface and therefore form multiple nano-level pores or structures on the metal surface 1106. The nanoscale surface treatment is implemented by, for example, wet etching the surface of the bottom plate 110 in a chemical solution to form multiple micro-pores. In another embodiment, the nanoscale surface treatment could be implemented by performing crystal growth or an oxidation process on the metal surface 1106 to form multiple micro-structures. Furthermore, the method of forming the first connectors 117 on the bottom plate 110 may include integrally bonding, by injection molding, the plastic material of the first connectors 117 onto the upper surface 1105 of the bottom plate 110 that is made of metal.

Referring to FIGS. 1A and 1B, the keycap 114 may include a metal layer 1144 and a cover layer 1145, wherein the metal layer 1144 is disposed between the cover layer 1145 and the bottom plate 110. In an embodiment, the cover layer 1145 can be made by plastic material, and the metal layer 1144 can be formed by stainless steel, galvanized steel, aluminum or aluminum-magnesium alloy. The cover layer 1145 can be formed by injection or insert molding a plastic material covering the upper surface of the metal layer 1144. The cover layer 1145 has characters printed thereon and is used as the top surface of the key switch for the user to identify and press.

Moreover, the second connectors 118 may include two first pivot members 1141 and two second pivot members 1142. Each first pivot member 1141 and each second pivot member 1142 respectively have a first opening O1 and a second opening O2 for rotatably receiving the corresponding first engagement shafts 1122 and the corresponding second engagement shafts 1132.

Figure 2B:
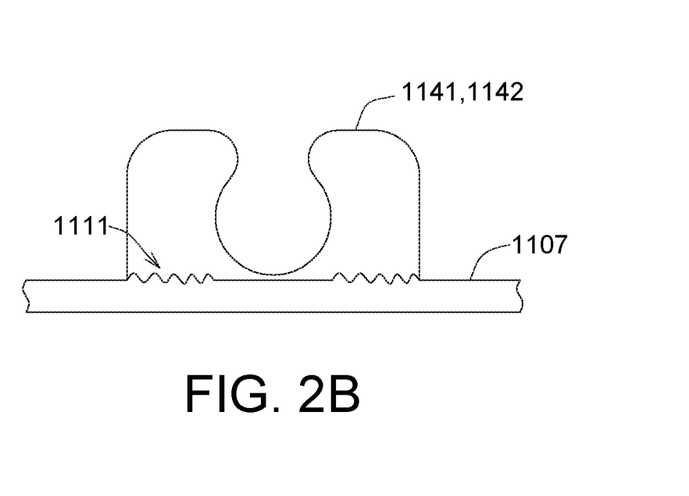
FIG. 2B is a schematic diagram of another connector.

Referring to FIG. 1B and FIG. 2B, the lower surface 1143 of the keycap 114 may include a metal surface 1107 (that is, the lower surface of the metal layer 1144). The metal surface 1107 has a porous structure. The second connectors 118 can be made by plastic parts (such as POM or ABS resin). The first pivot member 1141 and the second pivot member 1142 fill in the porous structure, and are directly bonded and joined to the metal surface 1107 to form a bonding structure 1111 at a heterointerface between the metal surface 1107 and the plastic pivot members.

In an embodiment, the method of forming the porous structure on the metal surface 1107 of the keycap 114 can adapt the above method of forming the porous structure on the metal surface 1106 of the bottom plate 110. For example, the lower surface of the metal layer 1144 can be roughened to form multiple nano-level pores or structures. Besides, the method of forming the second connectors 118 on the metal layer 1144 may include integrally bonding, by injection molding, the plastic material of the second connectors 118 to the lower surface of the metal layer 1144.

After the metal surface is processed with the surface treatment, the first connectors 117 can be directly bonded and integrally joined to the upper surface 1105 of the bottom plate 110 through the integration of different materials. Thus, there is no need to perform stamping process to punch and/or bend a sheet metal to form a connection structure on the bottom plate 110 for connecting to the supporting assembly 111. In an embodiment, as indicated in FIG. 1A and FIG. 1B, the bottom plate 110 does not have any through holes within the range of vertical projection of the first connectors 117. That is, what is right under the first limiting member 1101 and the second limiting member 1102 (the first sliding guide 1103 and the second sliding guide 1104) is the plate of the bottom plate 110, not the through hole. In another embodiment, in the absence of a backlight source, the bottom plate 110 does not have any through holes within the range of vertical projection of the keycap 114. It is noted that the first limiting member 1101 and the second limiting member 1102 are directly joined onto the upper surface 1105 of the bottom plate 110, and thus, the first limiting member 1101 and the second limiting member 1102 would not penetrate or extend from the upper surface 1105 of the bottom plate 110 to the lower surface of the bottom plate 110.

In terms of the structural strength, the formation of the first connectors 117 does not damage the strength of the bottom plate 110 because the bottom plate 110 does not undergo metal stamping beforehand. Therefore, even if the thickness of the bottom plate 110 is reduced, the bottom plate 110 can remain high structural strength and meet the demands for the thinner bottom plate. In an embodiment, the thickness of the metal bottom plate 110 can be 0.1-0.6 mm or even less. For example, when the bottom plate 110 is formed of stainless steel or galvanized steel, the thickness of the bottom plate 110 can be reduced to 0.1-0.2 mm; when the bottom plate 110 is formed of aluminum or aluminum-magnesium alloy, the thickness of the bottom plate 110 can be reduced to 0.3-0.5 mm.

Likewise, through the use of the above integration of the different materials in an integral single piece, the second connectors 118 can be firmly and directly bonded to the lower surface of the metal layer 1144 of the keycap 114 which has been processed with the surface treatment. Therefore, when the thickness of the metal layer 1144 and the cover layer 1145 is reduced, for example, to 0.1-0.6 mm, the structural strength of the key switch will not be affected. In comparison to the conventional design in which the entire keycap is made of plastic, the keycap 114 of the present invention could be thinner. Despite being thinner than that of the convention design, the metal layer 1144 can provide enhanced strength for the keycap 114. For example, when the metal layer 1144 is formed of a material having greater rigidity (such as a steel plate having a thickness of 0.1-0.2 mm), the thinner keycap 114 still can provide sufficient structural strength even when the thickness of the plastic cover layer 1145 as the top of the keycap 114 is reduced to 0.1-0.3 mm.

In an embodiment, the body of the keycap 114 does not have any through holes within the range of vertical projection of the second connectors 118. In another embodiment, the metal layer 1144 of the keycap 114 does not have any through holes. The metal layer 1144 disposed under the cover layer 1145 of the keycap 114 can enhance the structural rigidity of the keycap 114. Particularly, for space keys or some special keys that have two adjacent but not equilateral sides, the metal layer 1144 can enhance the rigidity of the keycap 114, thereby significantly alleviating the wobbling of the keycap 114 when the key is pressed.

Figure 3A:
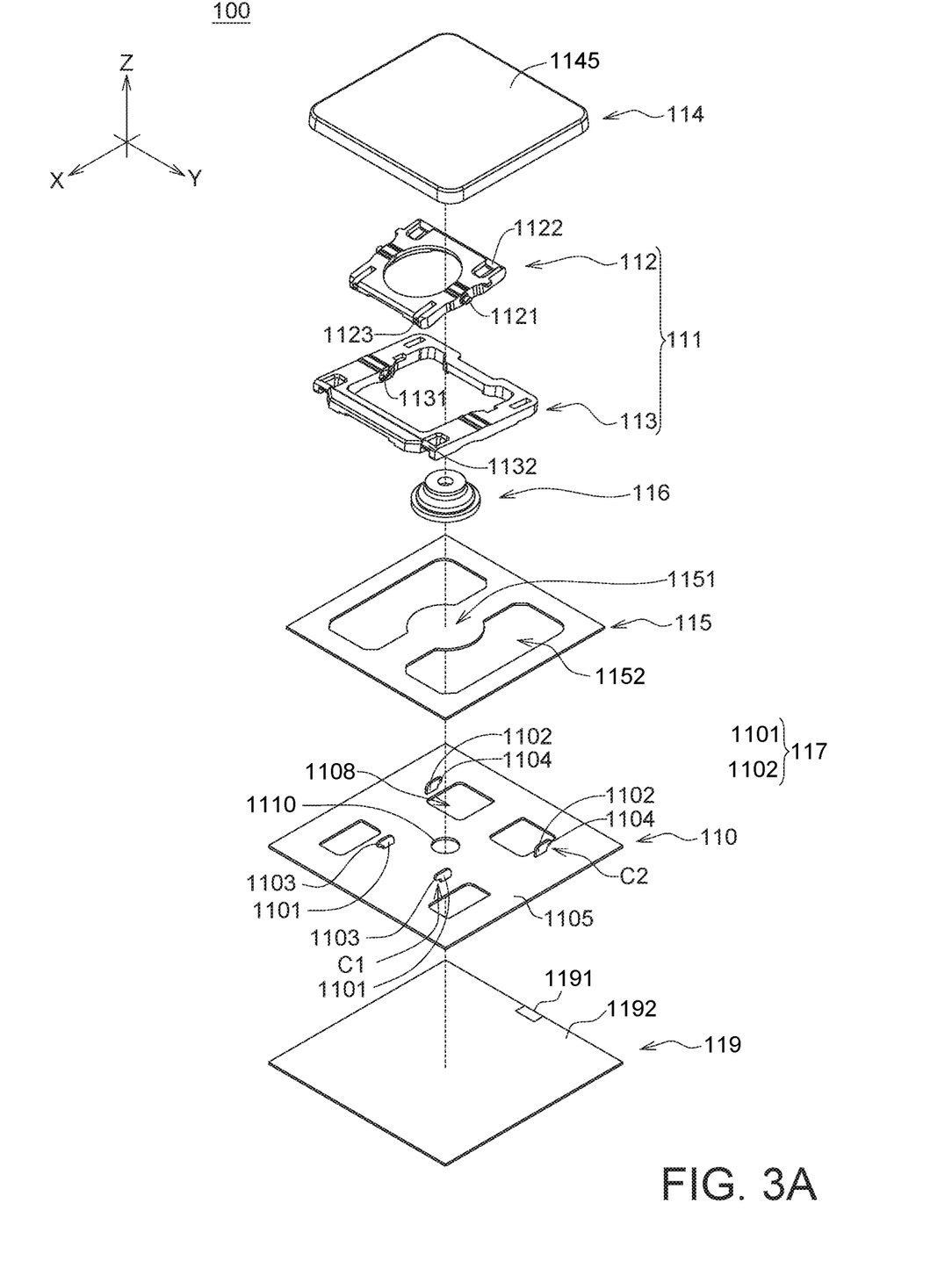
FIG. 3A is an exploded-view diagram of a key switch structure according to an embodiment of the present invention.
Figure 3B:
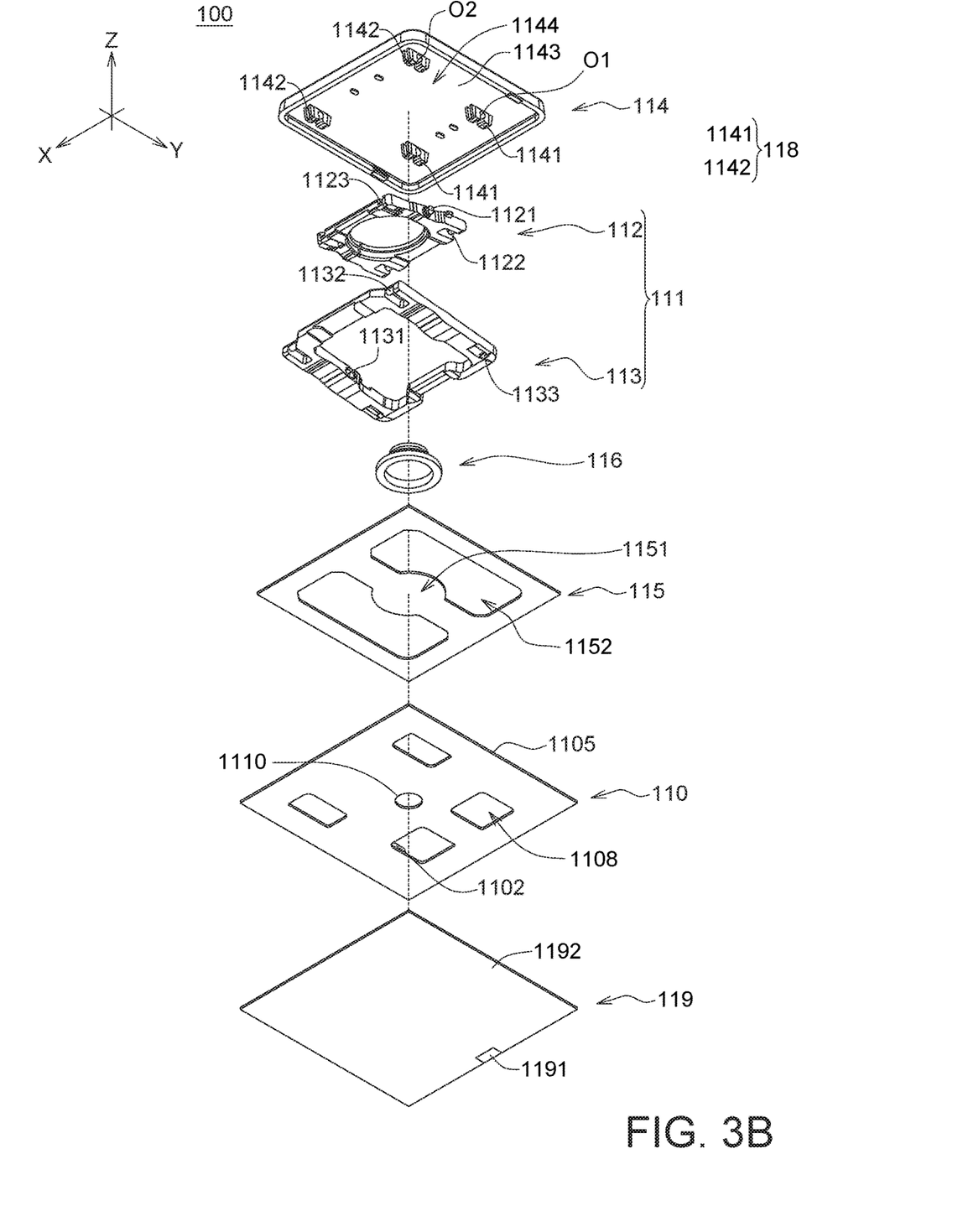
FIG. 3B is an exploded-view diagram of a key switch structure according to an embodiment of the present invention.

Referring to FIGS. 3A and 3B, according to another embodiment of the present invention, the key switch structure 100 may further include a light-emitting module 119 disposed under the bottom plate 110. The light-emitting module 119 includes a light source 1191 and a light guide plate 1192. The light source 1191 is disposed adjacent to the light guide plate 1192. With the disposition of the light-emitting module 119, the bottom plate 110 can have at least one through hole 1108 within the range of vertical projection of the keycap 114. Thus, the light emitted from the light-emitting module 119 can pass through the at least one through hole 1108 of the bottom plate 110 to illuminate the keycap 114. Additionally, the through hole 1108 is not within the range of vertical projection of the first limiting member 1101 and the second limiting member 1102. Also, the bottom plate 110 can have a through hole 1110 correspondingly disposed under the elastic member 116. The elastic member may at least overlap a portion of the through hole 1110. When the elastic member 116 is pressed down and contacts the switch element 1151, a part of the circuit board 115 would be pressed into the through hole 1110.

Similarly, the light emitted from the light-emitting module 119 can pass through the through hole 1110 to illuminate the keycap 114.

In the example of FIGS. 3A and 3B, the bottom plate 110 is provided with the through holes 1108 and 1110, such that the light emitted from the light-emitting module 119 disposed under the bottom plate 110 can pass through the through holes 1108 and 1110. Although the key switch structure in FIG. 1A does not have a backlight module, the bottom plate 110 in FIG. 1A can be provided with through holes just like the through hole 1108 and/or the through hole 1110 shown in FIGS. 3A and 3B. When the key switch is pressed, the supporting assembly 111 could be received in the through hole 1108, so that the thickness of the key switch structure can accordingly be reduced.

Figure 3C:
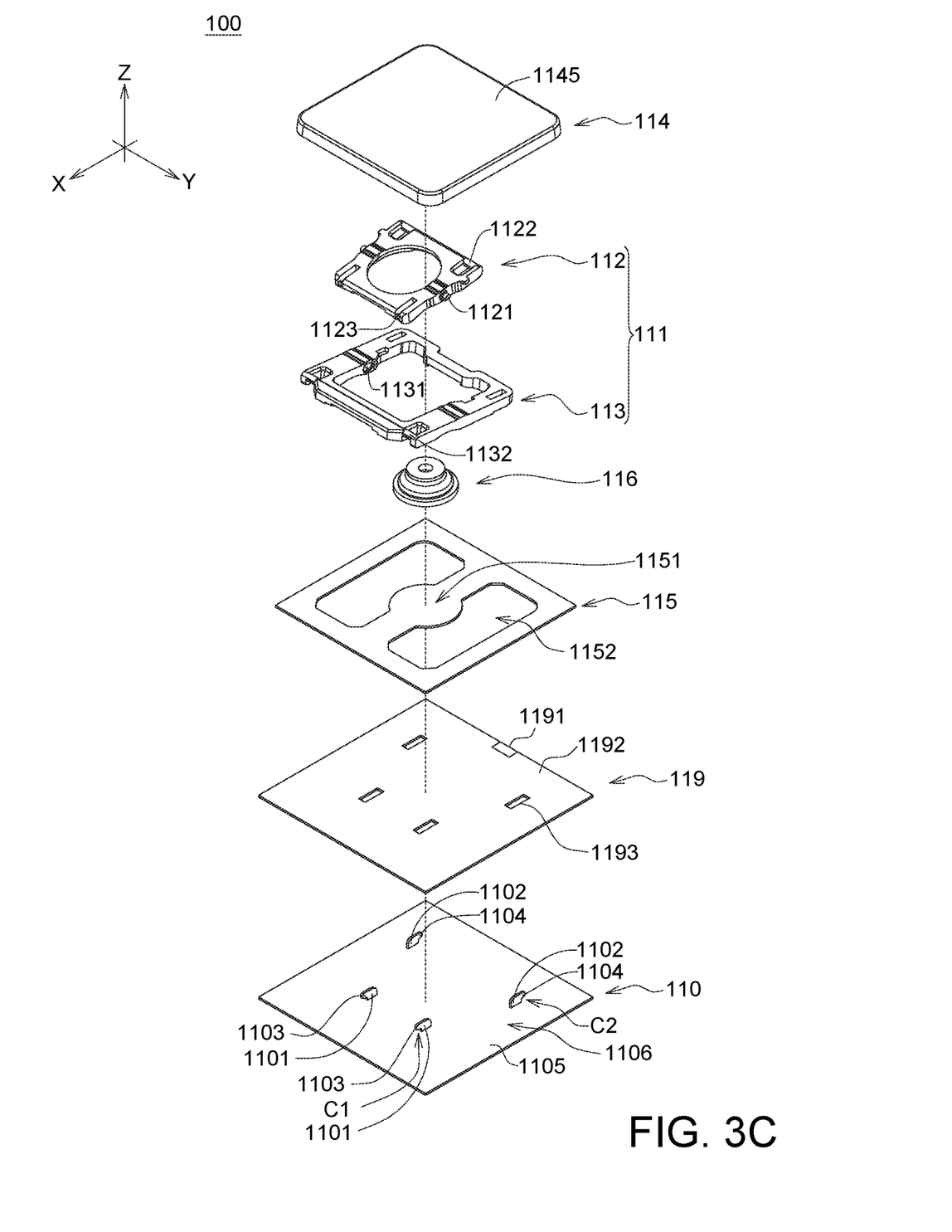
FIG. 3C is an exploded-view diagram of a key switch structure according to another embodiment of the present invention.

Referring to FIG. 3C, in another embodiment, the light-emitting module 119 can be disposed between the circuit board 115 and the bottom plate 110. The circuit board 1151 has multiple openings 1152, and the light guide plate 1191 has multiple openings 1193. The first limiting member 1101 and the second limiting member 1102 disposed on the bottom plate 110 can pass through the openings 1152 and 1193 to connect the supporting assembly 111. Moreover, since the bottom plate 110 is disposed under the light-emitting module 119, the disposition of the through holes 1108 and 1110 in FIGS. 3A and 3B can be optionally removed from the bottom plate 110 of the present embodiment.

In an embodiment as indicated in FIG. 3C, when the light-emitting module 119 is disposed between the circuit board 115 and the bottom plate 110, a reflective layer 1106 is disposed on the upper surface 1105 of the bottom plate 110. In an embodiment, the reflective layer 1106 can be a reflective coating formed by, for example, coating a reflective material on the upper surface 1105 of the bottom plate 110, such that the thickness of the reflective layer 1106 can be reduced. The reflective layer 1106 can increase the reflectivity of the bottom plate 110 to improve the light output of the light-emitting module 119. In the present embodiment, since the first connectors 117 are directly bonded to the bottom plate 110, the reflective layer 1106 is not arranged between the first connectors 117 and the bottom plate 110; otherwise, the bonding strength between the first connectors 117 and the bottom plate 110 might be affected.

According to the above embodiments of the present invention, the plastic connectors (e.g., the pivot members and/or limiting members) manufactured by forming the bonding structure 1111 at a heterointerface between two different materials can replace the conventional metal parts formed by bending or stamping a sheet metal, and therefore the manufacturing efficiency could be improved. Furthermore, the size of the pivot members and/or the limiting members formed on the thinner metal bottom plate can be controlled to be under a pre-set height, such that the overall height of the key switch structure can be effectively reduced to comply with the requirement of thinner keyboards. Besides, since the plastic connectors with elasticity are adaptable to automatic assembly, the supporting assembly and the keycap can be quickly installed and assembled on the bottom plate using an automated process to meet mass production requirements.

Figure 4:
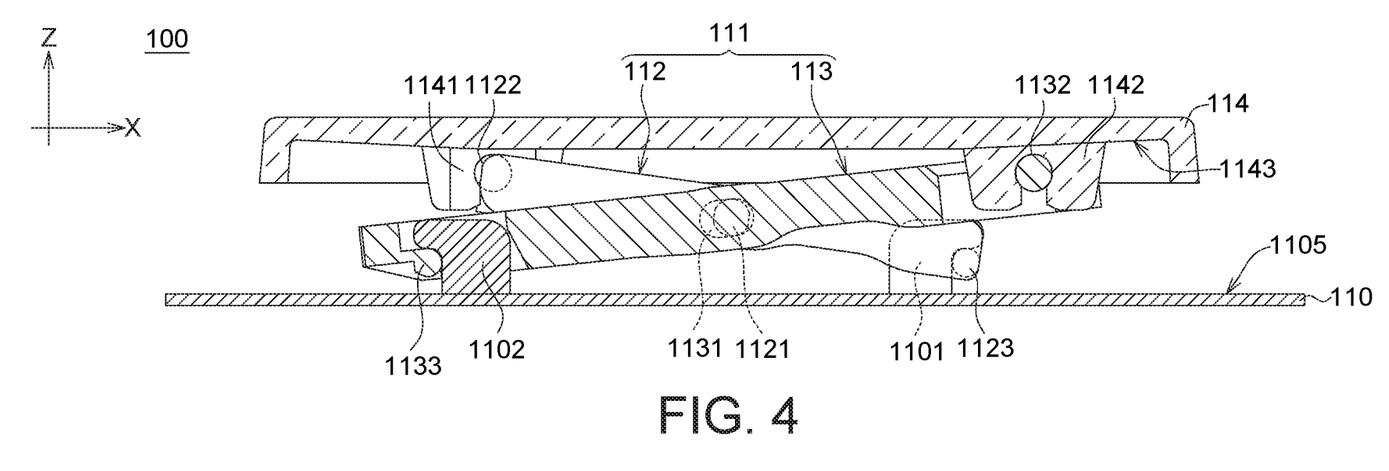
FIG. 4 to FIG. 6 respectively are cross-sectional views of a key switch structure according to an embodiment of the present invention.

FIG. 4 depicts a cross-sectional view of the assembled key switch structure 100 of FIG. 1A. In an embodiment, the first supporter 112 and the second supporter 113 are rotatably and pivotally connect the first pivot member 1141 and the second pivot member 1142 of the keycap 114 respectively. The other sides of the first supporter 112 and the second supporter 113 are fitted slidably in the first limiting member 1101 and the second limiting member 1102 of the bottom plate 110, respectively. In an embodiment of the present embodiment, the first pivot member 1141 and the second pivot member 1142 are directly bonded and joined to the lower surface 1143 of the keycap 114 through the integration of the different materials to form an integral piece. The first limiting member 1101 and the second limiting member 1102 are directly bonded and joined to the upper surface 1105 of the bottom plate 110 through the integration of the different materials to form an integral piece.

Figure 5:
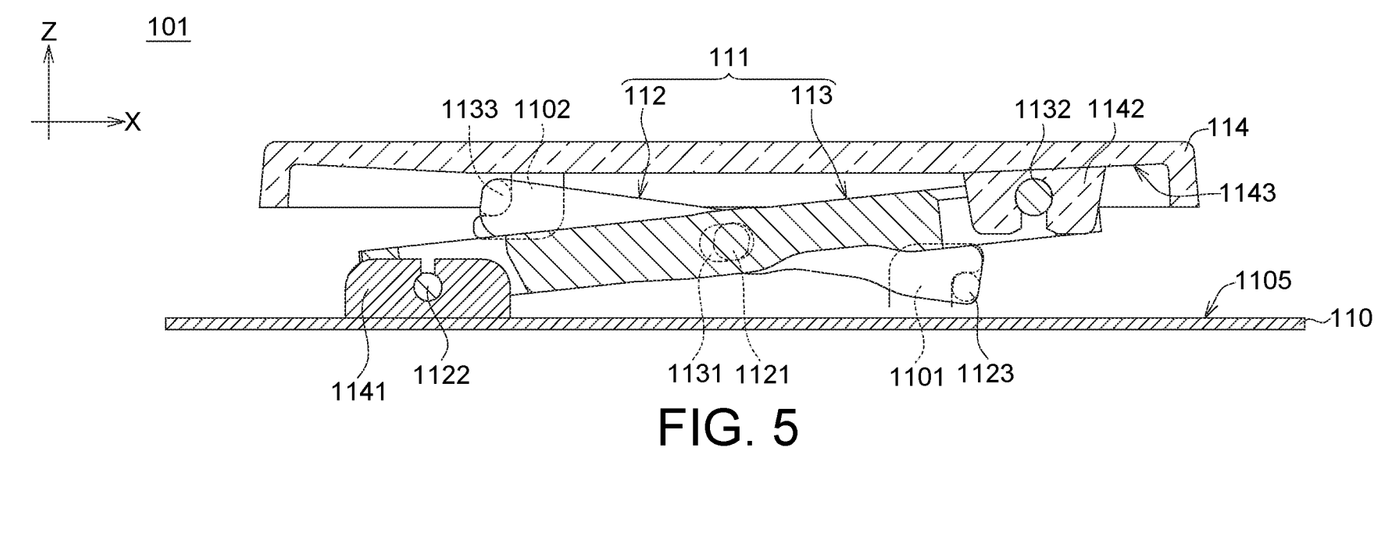

Refer to FIG. 5. According to another embodiment, in the key switch structure 101, the position of the second limiting member 1102 and the position of the first pivot member 1141 can be exchanged. That is, the second limiting member 1102 is disposed under the keycap 114, and the first pivot member 1141 is disposed above the bottom plate 110. As indicated in the left-hand side of FIG. 5, one end of the first supporter 112 is provided with a second sliding shaft 1133, and the second sliding shaft 1133 can be slidably connected to the second limiting member 1102 of the keycap 114. Furthermore, one end of the second supporter 113 is provided with a first engagement shaft 1122, and the first engagement shaft 1122 can be rotatably and pivotally connected to the first pivot member 1141 of the bottom plate 110. The present embodiment of FIG. 5 is different from the embodiment of FIG. 4 in that the first limiting member 1101 and the first pivot member 1141 are directly bonded to the upper surface 1105 of the bottom plate 110 through the integration of the different materials to form an integral piece, and the second limiting member 1102 and the second pivot member 1142 are directly bonded to the lower surface 1143 of the keycap 114 through the integration of the different materials to form an integral piece. The upper surface 1105 of the bottom plate 110 and the lower surface 1143 of the keycap 114 can be a metal surface, as indicated in FIGS. 2A and 2B.

Figure 6:
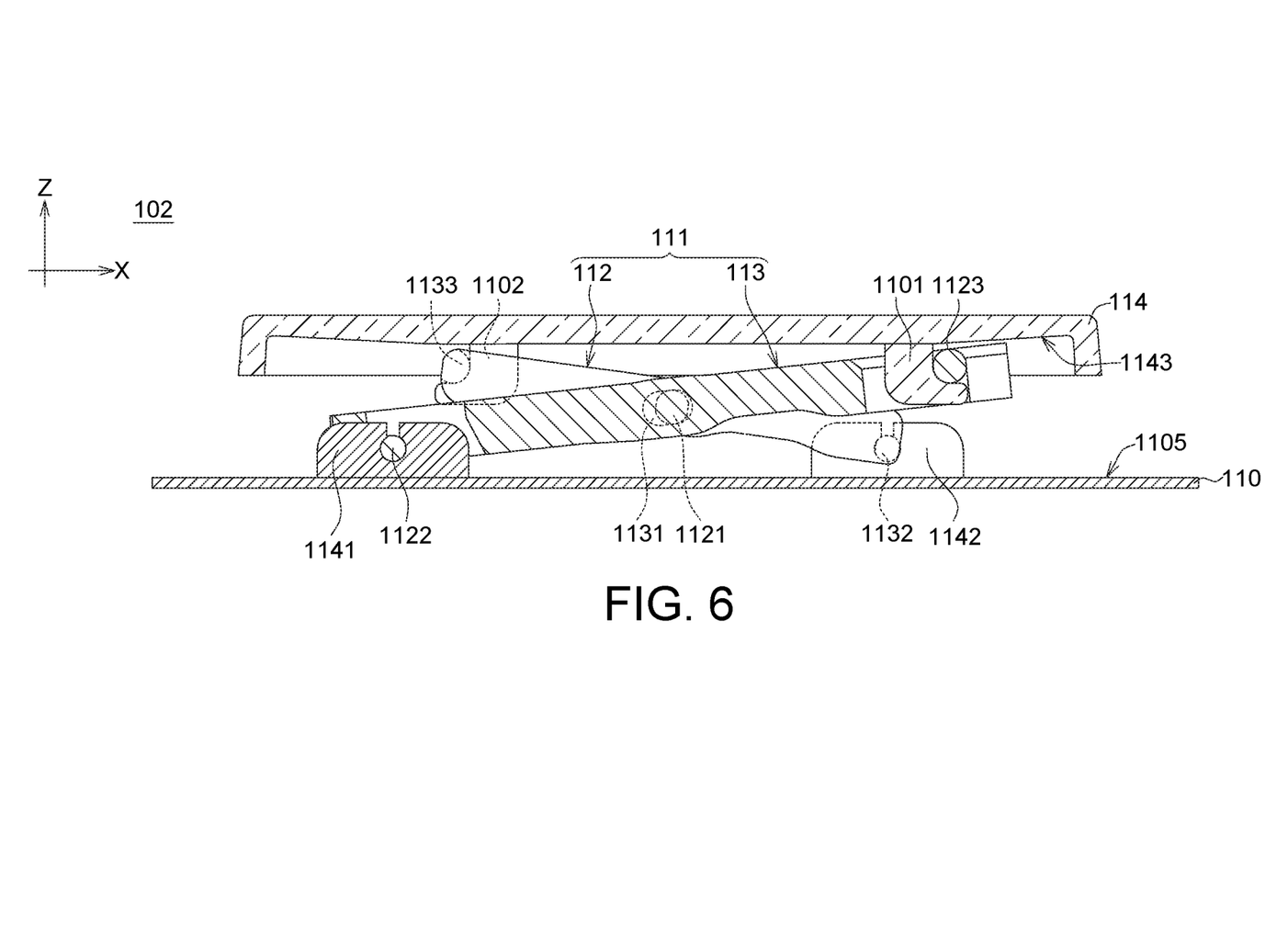

Referring to FIG. 6, according to another embodiment, in the key switch structure 102, the position of the first limiting member 1101 and the position of the second pivot member 1142 can be exchanged. That is, the first limiting member 1101 is disposed under the keycap 114, and the second pivot member 1142 is disposed above the bottom plate 110. As indicated in the right-hand side of FIG. 6, one end of the second supporter 113 is provided with a first sliding shaft 1123, and the first sliding shaft 1123 can be slidably engaged with the first limiting member 1101 of the keycap 114. Furthermore, one end of the first supporter 112 is provided with a second engagement shaft 1132, and the second engagement shaft 1132 can be rotatably and pivotally connected to the second pivot member 1142 of the bottom plate 110. The present embodiment of FIG. 6 is different from the embodiment of FIG. 4 in that the first pivot member 1141 and the second pivot member 1142 are directly bonded to the upper surface 1105 of the bottom plate 110 through the integration of the different materials to form an integral piece, and the first limiting member 1101 and the second limiting member 1102 are directly bonded to the lower surface 1143 of the keycap 114 through the integration of the different materials to form an integral piece.

Figure 7:
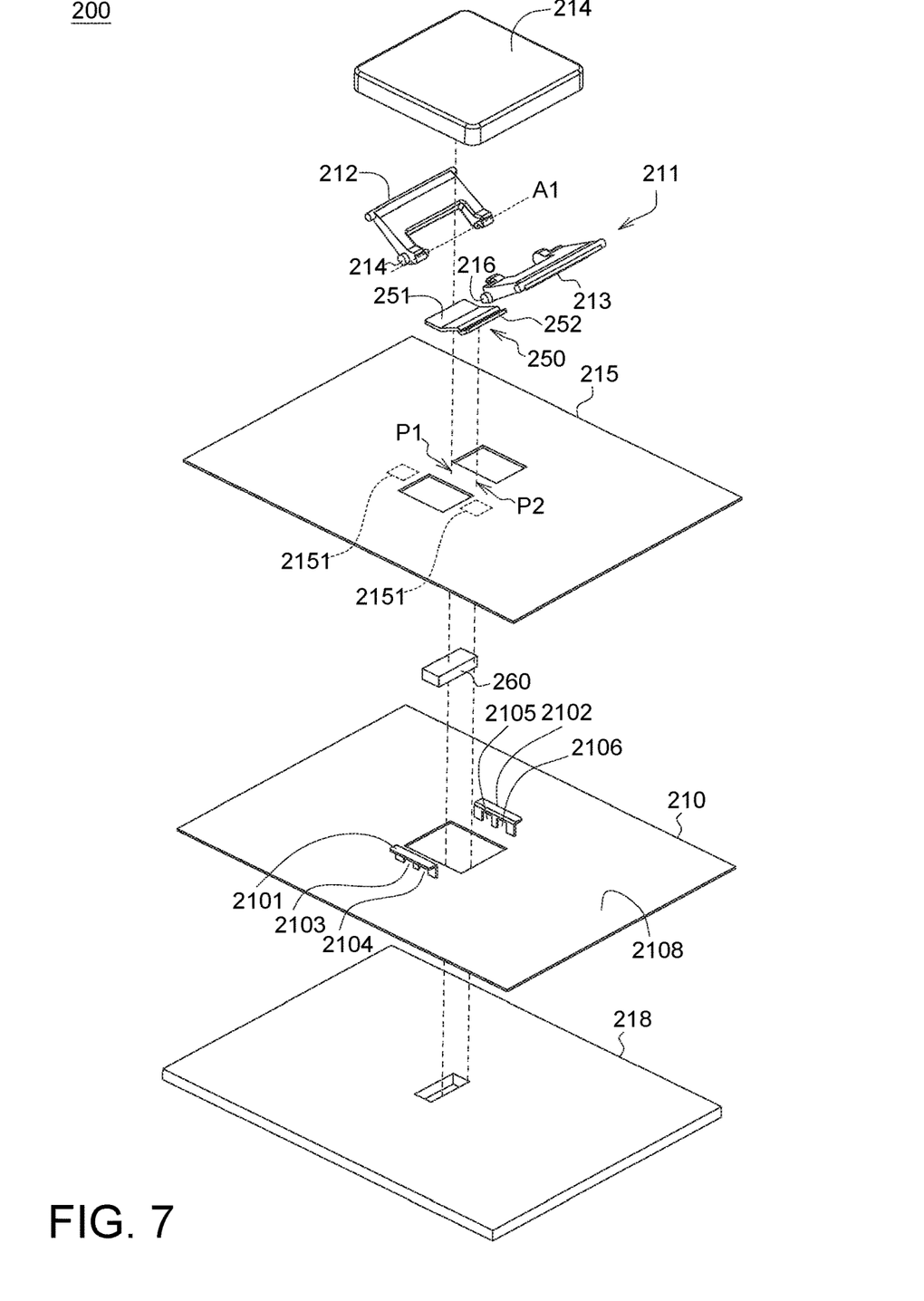
FIG. 7 is an exploded-view diagram of a key switch structure according to an embodiment of the present invention.

Referring to FIG. 7, an exploded-view diagram of a key switch structure 200 according to an embodiment of the present invention is shown. The key switch structure 200 may include a bottom plate 210, a supporting assembly 211, a keycap 214, an attractable part 250, and a magnetic element 260. The supporting assembly 211 is disposed under the keycap 214. The supporting assembly 211 includes a first supporter 212 and a second supporter 213. The first supporter 212 and the second supporter 213 can be arranged as a V-shaped assembly, and may or may not intersect with each other. The first supporter 212 is provided with a first engagement portion 214, and the second supporter 213 is provided with a second engagement portion 216. The first engagement portion 214 and the second engagement portion 216 are located on two opposite sides of the axis A1. The first supporter 212 and the second supporter 213 are coupled in alignment with the axis A1, such that the keycap 214 can move up or down with respect to the bottom plate 210 when the first supporter 212 and the second supporter 213 are folded or unfolded.

The attractable part 250 can be disposed under the second supporter 213 of the supporting assembly 211. The attractable part 250 has a first end 251 and a second end 252, which are correspondingly disposed above a first attractive position P1 and a second attractive position P2 respectively. Moreover, the magnetic element 260 is disposed in a board 218 under the bottom plate 210 and configured to provide a magnetic force, and is movable between the underneath of the first attractive position P1 and the second attractive position P2. When the first end 251 of the attractable part 250 is attracted by the magnetic element 260 via the magnetic force, the first end 251 of the attractable part 250 is relatively moved to the first attractive position P1, so that the keycap 214 is pushed upwards to a released position. When the second end 252 of the attractable part 250 is attracted by the magnetic element 260 via the magnetic force, the second end 252 of the attractable part 250 is relatively moved to the second attractive position P2, so that the keycap 214 is pulled downwards to a pressed position. In another embodiment, the magnetic element 260 can be fixed under the first end 251 of the attractable part 250, but the board 218 does not move. The key switch structure 200 of the present embodiment can further include a circuit board 215 disposed between the bottom plate 210 and the supporting assembly 211. The circuit board 215 includes at least one switch element 2151. When the keycap 214 is pressed, the first supporter 212 and the second supporter 213 are moved to the pressed position, such that the switch element 2151 can be conducted and triggered through the contact with an actuation portion (not shown) of the first supporter 212 or the second supporter 213, thereby generating a signal.

In an embodiment, the bottom plate 210 is disposed on the board 218, which can slide with respect to the bottom plate 210. In another embodiment, the bottom plate 210 can be fixed on the board 218, which does not move with respect to the bottom plate 210. In other embodiments, the board 218 is not required for the key switch structure 200, and the magnetic element 260 could be disposed in the bottom plate 210.

The bottom plate 210 includes a first limiting member 2101 and a second limiting member 2102, which are disposed oppositely. The first limiting member 2101 includes two first pivot holes 2103 and 2104, and the second limiting member 2102 includes two second pivot holes 2105 and 2106. The first pivot holes 2103 and 2104 and the second pivot holes 2105 and 2106 are disposed oppositely for receiving two ends of the first engagement portion 214 and two ends of the second engagement portion 216 respectively. In an embodiment, the two ends of the first engagement portion 214 of the first supporter 212 can be respectively disposed in a first pivot hole 2103 and a second pivot hole 2105; the two ends of the second engagement portion 216 of the second supporter 213 can be respectively disposed in another first pivot hole 2104 and another second pivot hole 2106. Thus, the supporting assembly 211 can be assembled on the bottom plate 210 through the first limiting member 2101 and the second limiting member 2102.

In the present embodiment, the first limiting member 2101 and the second limiting member 2102 are directly bonded to the upper surface 2108 of the bottom plate 210 through the integration of the different materials to form an integral and single piece. The upper surface 2108 of the bottom plate 210 may include a metal surface. The first limiting member 2101 and the second limiting member 2102 can be made by plastics. After the metal surface of the bottom plate 210 is processed with the surface treatment to form the microporous structure, the first limiting member 2101 and the second limiting member 2102 are injection molded onto the treated metal surface through the integration of the different materials to form an integral piece. Therefore, the bottom plate 210 does not need to be stamped or bent beforehand. That is, there is no need to perform a stamping process and sheet metal bending process on the bottom plate 210 to form the first limiting member 2101 and the second limiting member 2102. Instead, the first limiting member 2101 and the second limiting member 2102 are directly bonded and integrally joined to the bottom plate 210 through the integration of the different materials. Since no through hole would be formed in the bottom plate 210 correspond to the positions of the first limiting member 2101 and the second limiting member 2102, the structural strength of the limiting members are not affected by the reduction in the thickness of the bottom plate. In addition, the manufacturing cost can be further decreased when the thinner bottom plate is used.

Figure 8A:
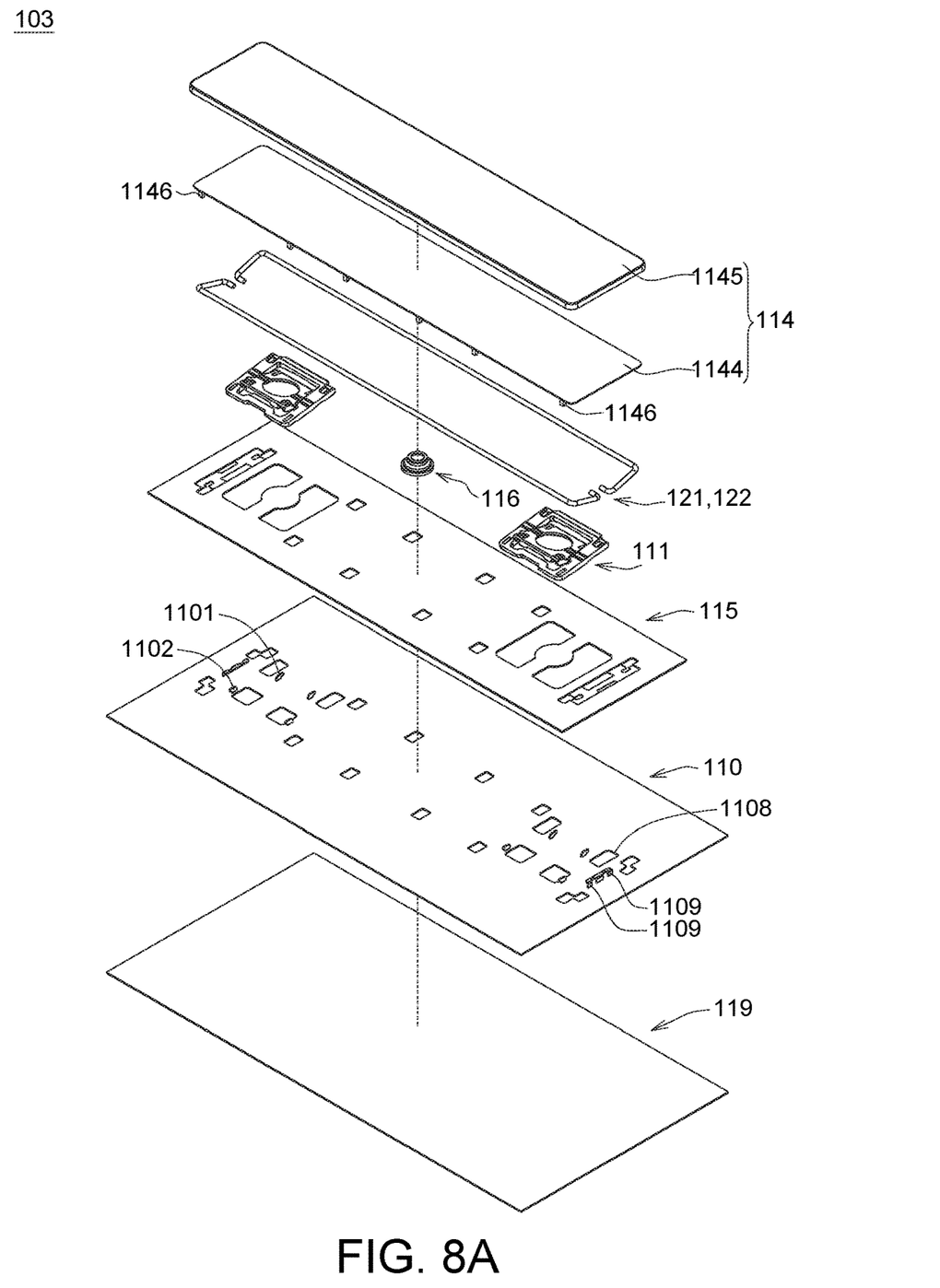
FIG. 8A and FIG. 8B respectively are exploded-view diagrams of a key switch structure according to another embodiment of the present invention.
Figure 8B:
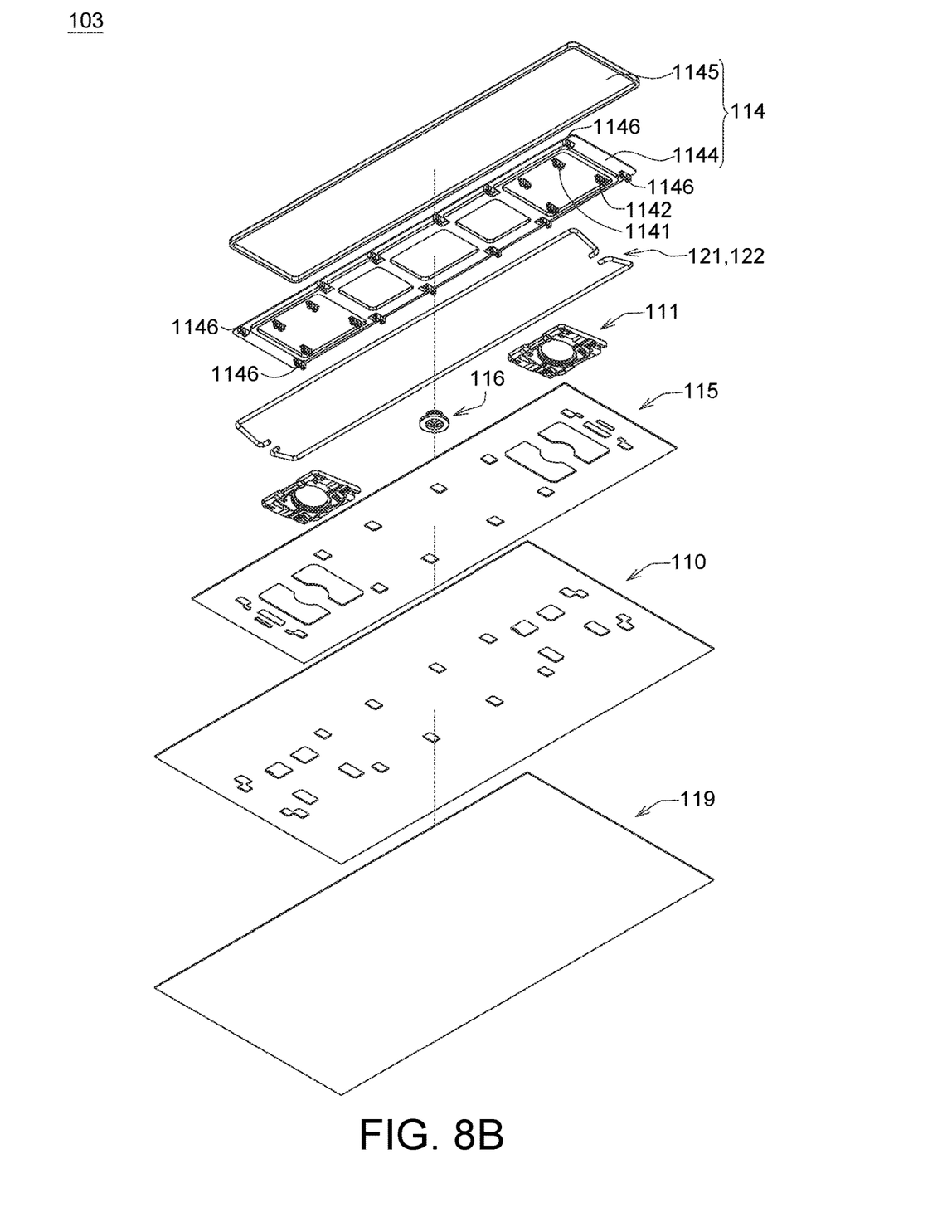

Referring to FIG. 8A and FIG. 8B, exploded-view diagrams of a key switch structure 103 according to another embodiment of the present invention are respectively shown. In addition to the elements of the key switch structure disclosed above, the key switch structure 103 may further include at least one linking rod 121 and/or 122, wherein the keycap 114 and the bottom plate 110 have at least one third pivot member 1146 and at least one third limiting member 1109 (i.e., the third connector) respectively disposed corresponding to the linking rods 121 and 122. The third limiting members 1109 are provided pivot holes, such that the linking rods 121 and 122 can be rotatably and slidably engaged with the third limiting members 1109 and the third pivot members 1146 between the bottom plate 110 and the keycap 114. The third limiting members 1109 and the third pivot members 1146 can be made by plastics via injection molding the plastic parts onto the metal surface, such that the third limiting members 1109 and the third pivot members 1146 are directly bonded to the upper surface of the bottom plate 110 and/or the lower surface of the keycap 114 (e.g., the lower surface of the metal layer 1144) through the integration of the different materials to form an integral piece. As elaborated in the above embodiments, the upper surface of the bottom plate 110 and/or the lower surface of the keycap 114 (e.g., the lower surface of the metal layer 1144) have been processed with the nanoscale surface treatment. Therefore, the bottom plate 110 does not need to be stamped beforehand.

To summarize, according to the key switch structure and the assembling method thereof disclosed in the embodiments of the present invention, the connectors for connecting the supporting assembly or linking rod are directly formed on the bottom plate through the integration of two different materials to form an integral piece. Therefore, the metal stamping process is not performed on the bottom plate to form connectors through a portion of the bottom plate material being punched and bent. As compared with the conventional keyboards, the thinner bottom plate in the embodiments of the present invention can be provided with sufficient structural strength. Moreover, by integrating the metal material in the keycap, the rigidity of the keycap can be maintained or even improved when the overall thickness of the keycap is reduced, so that the wobbling of the keycap being pressed can be alleviated. Thus, both the thickness and the weight of the key switch structure and the keyboard using the same can be further reduced without compromising the rigidity of the structure.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key switch structure, comprising:
   a bottom plate;
   a keycap disposed on the bottom plate;
   a supporting assembly disposed between the bottom plate and the keycap;
   a plurality of first connectors disposed on the bottom plate, wherein the first connectors are integrally formed and directly bonded to an upper surface of the bottom plate, and the first connectors and the bottom plate are made of different materials; and
   a plurality of second connectors disposed on the keycap, wherein the supporting assembly is connected to the bottom plate and the keycap respectively through the first connectors and the second connectors.

2. The key switch structure according to claim 1, wherein the upper surface of the bottom plate comprises a metal surface having a porous structure.

3. The key switch structure according to claim 2, wherein the first connectors made of plastic fill in the porous structure and are directly bonded to the metal surface to form a bonding structure at a heterointerface.

4. The key switch structure according to claim 1, wherein the bottom plate does not have any through hole within a range of vertical projection of the first connectors.

5. The key switch structure according to claim 1, wherein the second connectors are integrally formed and directly bonded to a lower surface of the keycap, and the second connectors and the lower surface of the keycap are made of different materials.

6. The key switch structure according to claim 5, wherein the lower surface of the keycap comprises a metal surface having a porous structure.

7. The key switch structure according to claim 6, wherein the second connectors made of plastic fill in the porous structure and are directly bonded to the metal surface to form a bonding structure at a heterointerface.

8. The key switch structure according to claim 5, wherein the keycap comprises a metal layer and a cover layer, and the metal layer is disposed between the cover layer and the bottom plate.

9. The key switch structure according to claim 8, wherein the cover layer covers on top of the metal layer.

10. The key switch structure according to claim 1, wherein the bottom plate does not have any through hole within a range of vertical projection of the keycap.

11. The key switch structure according to claim 1, further comprising an elastic member disposed between the bottom plate and the keycap.

12. The key switch structure according to claim 11, wherein the bottom plate has a through hole, and the elastic member at least overlaps a portion of the through hole.

13. The key switch structure according to claim 11, further comprising a circuit board disposed between the elastic member and the bottom plate.

14. The key switch structure according to claim 13, further comprising a light-emitting module disposed between the circuit board and the bottom plate.

15. The key switch structure according to claim 14, wherein the light-emitting module comprises a light guide plate and a light source disposed adjacent to the light guide plate.

16. The key switch structure according to claim 15, wherein the light guide plate and the circuit board respectively have a plurality of openings corresponding to the first connectors.

17. The key switch structure according to claim 14, further comprising a reflective layer disposed on the upper surface of the bottom plate.

18. The key switch structure according to claim 17, wherein the reflective layer is not disposed between the first connectors and the bottom plate.

19. The key switch structure according to claim 1, further comprising a light-emitting module disposed under the bottom plate, wherein light emitted from the light-emitting module passes through at least one through hole of the bottom plate to illuminate the keycap.

20. The key switch structure according to claim 19, wherein the light-emitting module comprises a light guide plate and a light source disposed adjacent to the light guide plate.

21. The key switch structure according to claim 19, wherein the through hole is not arranged within a range of vertical projection of the first connectors.

22. The key switch structure according to claim 1, wherein the supporting assembly comprises two engagement shafts and two sliding shafts, and the engagement shafts and the sliding shafts are respectively connected to the corresponding first connectors and the corresponding second connectors.

23. The key switch structure according to claim 22, wherein the first connectors comprises at least one limiting member having a sliding guide, and the sliding shaft is disposed between the sliding guide and the upper surface of the bottom plate.

24. The key switch structure according to claim 22, wherein the first connectors comprises at least one pivot member having an opening for receiving the corresponding engagement shafts.

25. The key switch structure according to claim 1, wherein the first connectors comprise two limiting members disposed oppositely, and the supporting assembly has a first engagement portion and a second engagement portion respectively connected to pivot holes of the limiting members.

26. The key switch structure according to claim 1, further comprising at least one linking rod connected to at least one third connector on the bottom plate, wherein the third connector is integrally formed and directly bonded to the upper surface of the bottom plate, and the third connector and the bottom plate are made of different materials.

* * * * *